US 7,447,288 B2

(12) United States Patent
Bougeard et al.

(10) Patent No.: US 7,447,288 B2
(45) Date of Patent: Nov. 4, 2008

(54) METHOD FOR DEMODULATING A SIGNAL INTEGRATING PHASE ERROR EFFECT AND CORRESPONDING RECEIVER

(75) Inventors: Stephane Bougeard, Rennes (FR); Jean-Francois Helard, Rennes (FR); Isabelle Siaud, Rennes (FR)

(73) Assignee: France Telecom, Paris (FR)

( * ) Notice: Subject to any disclaimer, the term of this patent is extended or adjusted under 35 U.S.C. 154(b) by 443 days.

(21) Appl. No.: 10/477,810

(22) PCT Filed: May 15, 2002

(86) PCT No.: PCT/FR02/01641

§ 371 (c)(1),
(2), (4) Date: May 24, 2004

(87) PCT Pub. No.: WO02/093862

PCT Pub. Date: Nov. 21, 2002

(65) Prior Publication Data

US 2004/0218706 A1  Nov. 4, 2004

(30) Foreign Application Priority Data

May 15, 2001 (FR) .................................. 01 06411

(51) Int. Cl.
*H04L 7/00* (2006.01)

(52) U.S. Cl. ..................... 375/371; 375/346; 375/324

(58) Field of Classification Search ................. 375/226, 375/261, 371, 298, 227, 340, 284, 346; 370/207; 455/214, 226.3
See application file for complete search history.

(56) References Cited

U.S. PATENT DOCUMENTS 4,247,944 A * 1/1981 Sifford ........................ 375/340

(Continued)

FOREIGN PATENT DOCUMENTS

EP          0 465 851          1/1992

(Continued)

OTHER PUBLICATIONS

George Chrisikos, Analysis of 16-QAM Over a Nonlinear Channel, The Aerospace Corporation, Los Angeles, 1998 IEEE.*

(Continued)

*Primary Examiner*—Chieh M. Fan
*Assistant Examiner*—Aristocratis Fotakis
(74) *Attorney, Agent, or Firm*—Westman, Champlin & Kelly, P.A.

(57) ABSTRACT

The invention concerns a method for demodulating a digital signal received via a transmission channel, comprising a step which consists in associating with each value received of said received signal a point of the corresponding modulation constellation, on the basis of the decision boundaries taking into account the potential effect of a phase shift on at least one of said points of the modulation constellation and of the potential effect of an Gaussian additive noise applied on said point, said Gaussian additive noise being represented by a generating surface associated with said point, and said phase shift by a rotation on an angular range based so that said swept surface belongs essentially to the region of decision associated with the corresponding point of the modulation constellation, plotted on the basis of at least one phase and/or amplitude characteristic of said modulation, so as to associate with each of said points of the constellation a portion of a reception space, called corresponding region of decision.

20 Claims, 7 Drawing Sheets

U.S. PATENT DOCUMENTS

| | | | | |
|---|---|---|---|---|
| 4,827,431 A * | 5/1989 | Goldshtein | ................. | 375/226 |
| 4,843,616 A * | 6/1989 | Hoffmann | ................... | 375/327 |
| 5,519,356 A * | 5/1996 | Greenberg | .................. | 329/304 |
| 5,640,417 A * | 6/1997 | Barabash et al. | ............ | 375/222 |
| 5,867,539 A * | 2/1999 | Koslov | ....................... | 375/346 |
| 6,487,261 B2 * | 11/2002 | Iwamatsu et al. | ........... | 375/346 |
| 6,744,827 B1 * | 6/2004 | Vandenabeele et al. | ..... | 375/320 |
| 6,785,342 B1 * | 8/2004 | Isaksen et al. | .............. | 375/284 |
| 6,826,238 B2 * | 11/2004 | Ahn | ........................... | 375/326 |

FOREIGN PATENT DOCUMENTS

| | | |
|---|---|---|
| JP | 61 024354 | 2/1986 |
| WO | WO 01/01650 | 1/2001 |

OTHER PUBLICATIONS

Fernando Lopez de Victoria, "An Adaptive Blind Equalization Alorithm for QAM and QPR Modulations: The Concentric Ordered Modulus Algorithm, with Results for 16QAM and 9QPR", Applied Signal Technology, Inc., 1991 IEEE.*

"An Interference Immunity Decoding Method for Multicarrier Trellis-Coded SFH/16QAM", Shinoi et al., Electronics & Communications in Japan, Part I, vol. 82, No. 11, Nov. 1999, pp. 8-18.

* cited by examiner

- Constellation $C_1$
— Decision-making boundaries $F_1$

- Constellation $C_0$
- Constellation $C_1$

METHOD FOR DEMODULATING A SIGNAL INTEGRATING PHASE ERROR EFFECT AND CORRESPONDING RECEIVER

CROSS-REFERENCE TO RELATED APPLICATION

This Application is a Section 371 National Stage Application of International Application No. PCT/FR02/01641, filed May 15, 2002 and published as WO 02/093862 on Nov. 21, 2002, not in English.

FIELD OF INVENTION

The domain of the invention is transmission of digital signals, particularly in the presence of phase noise. More precisely, the invention relates to an improvement in demodulation of such signals, and particularly optimisation of latching of the synchronisation system and a reduction in the probability of this synchronisation system becoming unlatched.

BACKGROUND OF THE INVENTION

The invention is used in applications in very many technical domains, for single-carrier and for multi-carrier signals, particularly for amplitude modulations in quadrature (MAQ) regardless of the number of states. It is particularly advantageous for transmission in burst mode.

Systems developed in telecommunications operate at increasingly high frequencies, using modulations with a very large number of states. The quality of the local oscillator that controls the frequency transposition then becomes a technological lock. As the frequency of these systems increases, it becomes technologically more difficult to design oscillators with good frequency stability and low phase noise.

Therefore an attempt is made to optimise performances of the phase locking loop to overcome problems due to degradation to system performances induced by hyperfrequency oscillators of the type available to the general public.

In general, demodulation consists of putting received values into a space taking account of the modulation constellation used. This space is broken down into decision regions, defined by decision-making boundaries. Each region is assigned to one of the constellation states which is considered to be the most probable, and that is selected as the demodulation result when a received value is located in this region.

In the following, we will present examples of an MAQ modulation received in a single-sensor receiver. The reception space is then the Fresnel plane (I/Q plane). This two-dimensional example efficiently describes the state-of-the-art and the characteristics of the invention. However, it is quite clear that the invention is equally applicable to other modulation types, possibly using spaces with more than two dimensions. Similarly, the use of multi-sensor receivers can lead to the definition of reception spaces with more than two dimensions.

Therefore, MAQ type digital modulation techniques are based on the use of a modulation constellation in single-sensor receivers, conventionally represented in the I/Q plane in the form shown in FIG. 1 in the special case of an MAQ16 modulation (only the first quadrant is shown. The three other quadrants are directly deduced by symmetry).

The modulation points 11 are uniformly distributed at equal distances from each other. The modulation then consists of choosing one of the points 14 from among the 16 points available in the constellation. The received value 12 after transmission through a transmission channel affected by various disturbances is often significantly offset (13) from the ideal point 14.

Therefore, the demodulation operation consists of associating the received value 12 with the most probable emitted point 14. This is done by defining demodulation boundaries 15 parallel to the I and Q axes, maximising the distances (the received value 12 is considered to correspond to the closest point 14). Therefore, these boundaries 15 define zones 16, each associated with a point 14 in the modulation constellation.

This technique provides a relatively efficient means of overcoming Gaussian additive noise. On the other hand, errors can occur in the presence of important phase errors, as is the case particularly in the synchronisation system latching phase in the presence of a frequency offset, or in the presence of loud phase noise. For example, a phase shift 17 will lead to a demodulation error, the received value 18 being considered to correspond to point 19 and not to point 14.

In particular, one purpose of the invention is to overcome this disadvantage in the state of the art.

More precisely, one purpose of the invention is to provide a demodulation technique for reducing the effects of a frequency offset more efficiently than is possible with a conventional technique.

Consequently, one purpose of the invention is to provide such a technique enabling faster latching of the synchronisation system, particularly in the presence of a frequency offset.

Obviously, another purpose is to provide such a technique for reducing the probability of the synchronisation system becoming unlatched.

Another purpose of the invention is to provide such a technique that is easy and inexpensive to implement, particularly in receivers used by the general public without needing to make any modifications to hyper-frequency oscillators.

Another purpose of one particular aspect of the invention is to provide such a technique that is adaptive, and that takes account of all disturbances induced through the transmission channel (phase noise or Gaussian additive noise).

These objectives, and others that will become clearer later, are achieved using a method for demodulation of a digital signal received through a transmission channel, comprising a step in which each received value of the said received signal is associated with a corresponding point in the modulation constellation, as a function of decision-making boundaries, plotted as a function of at least one phase and/or amplitude characteristic of the said modulation, so as to associate a corresponding decision region with each of the said points in the constellation.

SUMMARY OF THE INVENTION

According to the invention, the process comprises the following steps:
  association of at least one generating zone enclosing the said point with at least one of the said points in the said modulation constellation, the zone representing the potential effect of Gaussian additive noise;
  application of a rotation to the said generating zone in the said reception space, over an angular range that depends on symmetries defined by the said modulation, so as to define a surface scanned by the said generating zone, representing the potential effect of a phase shift on the said point;

definition of at least one boundary, chosen such that the said scanned surface belongs essentially to the decision region associated with the corresponding point in the modulation constellation.

Thus, the invention proposes to modify conventional modulation boundaries (usually minimising distances from points in the modulation constellation), taking account firstly of the fact that under some conditions a phase error can significantly shift a received signal point from the corresponding emitted point, and secondly the fact that the received signal may be disturbed by Gaussian additive noise (white noise and/or coloured noise).

Therefore, it is proposed that this received point should not systematically be assigned to the closest point in the constellation, but to the most probable point taking account of a potential phase shift.

Note that according to this aspect, the invention does not require any specific processing at the emission (although one advantageous modulation process will be proposed later on). Therefore, the same signal may be processed firstly by conventional receivers, and secondly and more efficiently in terms of the error rate and/or the latching rate, by receivers using the demodulation process according to the invention.

However, it will be noted that receivers implementing the invention take account of aspects related to the emission (the structure of the constellation used) and reception (Gaussian noise).

According to one preferred embodiment of the invention, the said decision-making boundaries are plotted in the I/Q plane so as to associate a decision region corresponding to a portion of the said I/Q plane, with each of the said points in the modulation constellation. Obviously, the same approach can be adapted for other embodiments.

Preferably, in this case, the said boundaries are variable as a function of variations in the said Gaussian additive noise. It is thus possible to optimise demodulation as a function of reception conditions.

Advantageously, the said generating zone forms a disk, the radius of which may for example be proportional to the standard deviation of the said Gaussian additive noise.

Preferably, at least one of the said disks is centered on the corresponding point in the said modulation constellation.

Advantageously, at least two concentric generating zones are taken into account, to trace at least one boundary for at least one of the said points in the said modulation constellation.

According to one particular embodiment, at least one of the said boundaries is a combination of at least one portion of a boundary corresponding approximately to an edge of the said scanned surface and at least one linear portion corresponding to an axis of symmetry defined by the said modulation constellation.

According to one advantageous embodiment of the invention, at least one of the said generating zones is not centered on the corresponding point in the said modulation constellation, so as to simulate a modification to the constellation at the emission.

The points associated with at least one boundary adapted as a function of the potential effect of a phase shift preferably comprise at least the points in the constellation furthest from the centre of the said I/Q plane.

These are the points that are most sensitive to phase errors. Therefore in simplified embodiments, it can be assumed that they are the only points concerned.

According to one preferred embodiment, the said modulation constellation corresponds to an amplitude modulation in quadrature (MAQ).

In particular, boundaries like those shown in FIG. 5 or 11 or 13 are advantageously used in the case of an MAQ modulation 16 (it is inconvenient and inefficient to describe these boundaries mathematically, while the figures give a direct understanding. This is why, exceptionally, reference is made to the figures in the corresponding claim).

Depending on the specific embodiment, the said received signal may be a multi-carrier signal or a single-carrier signal. In particular, it may be a signal transmitted in burst, in which case the invention is particularly advantageous.

The demodulation process according to the invention is advantageously used during a latching phase in a phase locking loop.

It may also be used advantageously under continuous reception conditions, after a phase locking loop has been latched, either at all times or at least in the presence of loud phase noise.

According to one preferred embodiment of the invention, it is planned that if the Gaussian additive noise is greater than a predetermined threshold, the said boundaries ignore the said potential effect of phase noise. The result is a conventional constellation.

According to one particular embodiment, the process according to the invention comprises the following steps:
compare the said received value with a first set of boundaries, called conventional boundaries, formed so as to maximise distances between the said points in the said constellation and so as to make a first decision on the emitted point corresponding to the said received value;
measure the amplitude of the received value with respect to the centre of the said constellation;
measure the signal-to-noise ratio;
possibly modify the said first decision, as a function of the said amplitude and the said signal-to-noise ratio, so as to provide a second decision based on the said boundaries taking account of the potential effect of a phase shift;
if applicable, lift the ambiguity between at least two points in the said modulation constellation, as a function of a measurement of the angular position of the said received value.

The invention also relates to a modulation process for a digital signal using a modulation constellation, according to which the position of at least one of the points in the said modulation constellation is chosen taking account of the potential effect of a phase rotation on this point, so as to increase the probability of the corresponding received value being correctly demodulated, after transmission through a transmission channel that could induce the said phase rotation.

Once again, the objective is to take account of the potential action of a phase error. However, in this case this action is anticipated to obtain a better demodulation quality in reception.

It is possible, but not compulsory, to implement the modulation process and the demodulation process described above in the same system.

The invention also relates to receivers of a digital signal received through a transmission channel using the demodulation process described above. This type of receiver comprises demodulation means comprising means of associating a corresponding point in the modulation constellation with each received value of the said received signal, as a function of decision-making boundaries plotted as a function of at least one phase and/or amplitude characteristic of the said modulation, so as to associate each of the said points in the constellation with a corresponding decision region.

According to the invention, at least one of the said boundaries is adapted taking account firstly of the potential effect of a phase shift on at least one of the said points in the modulation constellation, and secondly the potential effect of Gaussian additive noise applied to the said point, the said Gaussian additive noise being represented by a generating surface associated with the said point, and the said phase shift by a rotation on an angular range that depends on symmetries defined by the said modulation, so as to define a surface scanned by the said generating zone, the said boundary being chosen such that the said scanned surface belongs approximately to the decision region associated with the corresponding point in the modulation constellation.

The invention also relates to a system for transmission of at least one digital signal, from at least one emitter to at least one receiver, using means of modifying the modulation constellation on emission and or on reception, and/or means of modifying the corresponding decision-making boundaries, taking account firstly of the potential effect of a phase shift on at least one of the said points in the modulation constellation, and secondly the potential effect of Gaussian additive noise applied to the said point, the said Gaussian additive noise being represented by a generating surface associated with the said point, and the said phase shift by rotation on an angular range that depends on symmetries defined by the said modulation, so as to define a surface scanned by the said generating zone, the said boundary being chosen such that the said scanned zone belongs mostly to the decision region associated with the corresponding modulation constellation point.

Finally, the invention also relates to a digital signal using a modulation constellation, in which the position of at least one of the points is chosen taking account of the potential effect of phase rotation on this point, so as to increase the probability of the corresponding received value being correctly demodulated after transmission through a transmission channel that could induce the said phase rotation.

BRIEF DESCRIPTION OF THE DRAWINGS

Other characteristics and advantages of the invention will become clear after reading the following description of preferred embodiments of the invention given as simple illustrative examples, and the attached drawings among which.

DETAILED DESCRIPTION OF THE PREFERRED EMBODIMENTS

1 —THE STRUCTURE OF THE SYNCHRONISATION SYSTEM

Figure 2:
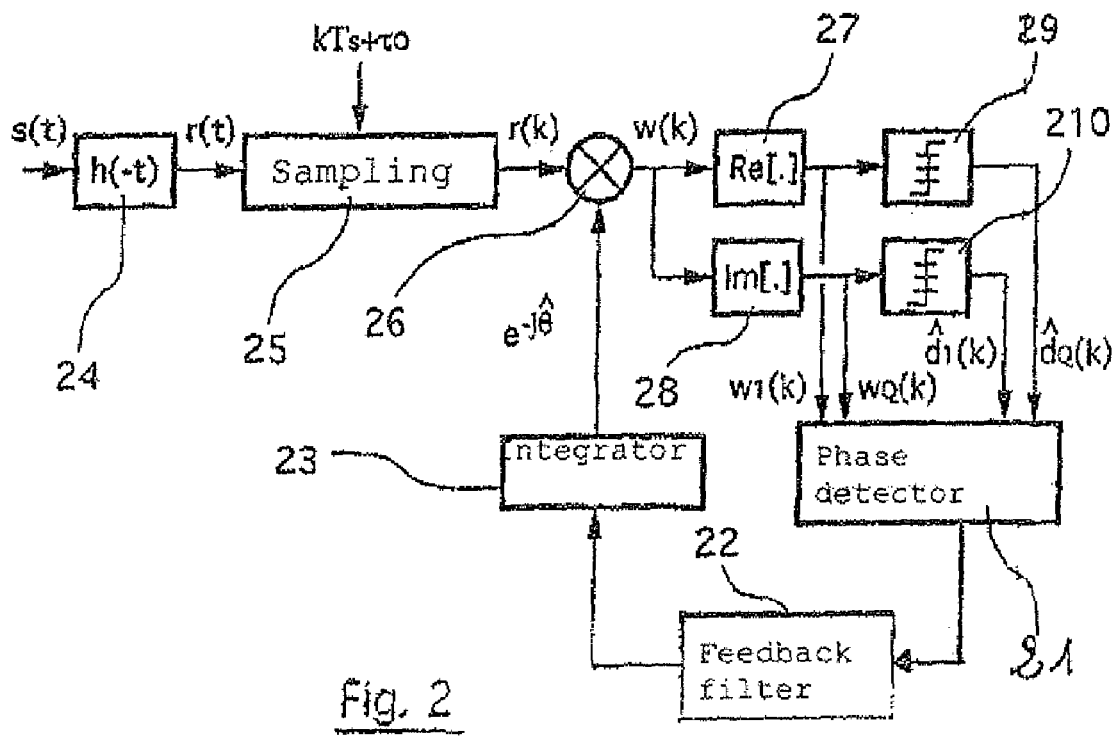
FIG. 2 shows a block diagram of a digital synchronisation system, known in itself.

FIG. 2 shows an example embodiment consisting of a digital carrier synchronisation system of a receiver using a Directed Decision (DD) algorithm derived from application of a Maximum Likelihood (ML) criterion based on a feedback (FB) structure and prior retrieval of the rate (T).

The structure of the system is based on the derivative of the Maximum A Posteriori Likelihood criterion (1) with respect to the phase error.This system is called DDMLFBT and is composed of three elements; a phase detector 21, a feedback filter 22 and an integrator 23, as shown in figure 2.

Nevertheless, solutions according to the invention may be applicable in all digital carrier synchronisation systems based on a Directed Decision algorithm that uses a received symbols estimate.

We will not discuss details of other elements in this FIG. 2, which are known in themselves. The emitted signal s(t) is received in the form r(t), after transmission through a transmission channel 24. This received signal is sampled (25) and then demodulated using a multiplier 26 controlled by the integrator 23. The real part (27) and the imaginary part (28) are separated from the demodulated signal w(k). They can be used to make a comparison with the original constellation (29, 210), and are input to the phase detector 21.

The role of the phase detector 21 in which we are particularly interested within the context of this invention, is to provide information representative of the phase error. This information is then filtered (22) and then integrated (23) in the loop in order to generate the phase correction $\hat{\theta}$ to be made to the signal.

1.1 The Phase Detector.

The phase detector 21 is the keystone of the feedback structure and must be capable of evaluating the residual error between the sample $w(k)=r(k)e^{-j\theta}$ with phase correction and the estimated symbol $\hat{d}(k)$ used as the phase reference. This estimated symbol is obtained by applying conventional decision-making boundaries $F_0$ of the constellation $C_0$ related to the modulation used, to the symbol w(k).

The phase detector 21 may be defined by its characteristic $\epsilon(\phi)$ derived from application of the Maximum Likelihood criterion and that for example may be determined by the following expressions [2]:

$$\epsilon_1(k)=Im^{[\hat{d}^*(k)w(k)]}$$

$$\epsilon_2(k)=Im^{[csgn[w^*(k)]w(k)]}$$

$$\epsilon_3(k)=Im^{[w^*(k)csgn[w(k)-\hat{d}(k)]]}$$

$$\epsilon_4(k)=Im^{[csgn[w^*(k)][w(k)-\hat{d}(k)]]}$$

$$\epsilon_5(k)=Im^{[\hat{d}^*(k)csgn[w(k)-\hat{d}(k)]]}$$

$$\epsilon_6(k)=Im^{[csgn[w^*(k)]csgn[w(k)-\hat{d}(k)]]}$$

where csgn(x)=sgn[Re[x]+jsgn[Im[x]]

A study of the characteristics of phase detectors made by D. Mottier [1] leads to selection of the detector $\epsilon_4(k)$ for its good properties in the case of MAQ type modulations. Therefore, this detector is used as an example in the following, associated with an MAQ16. However, the process described below is equally applicable regardless of the type of detector chosen and regardless of the order of the constellation MAQ.

Figure 3:
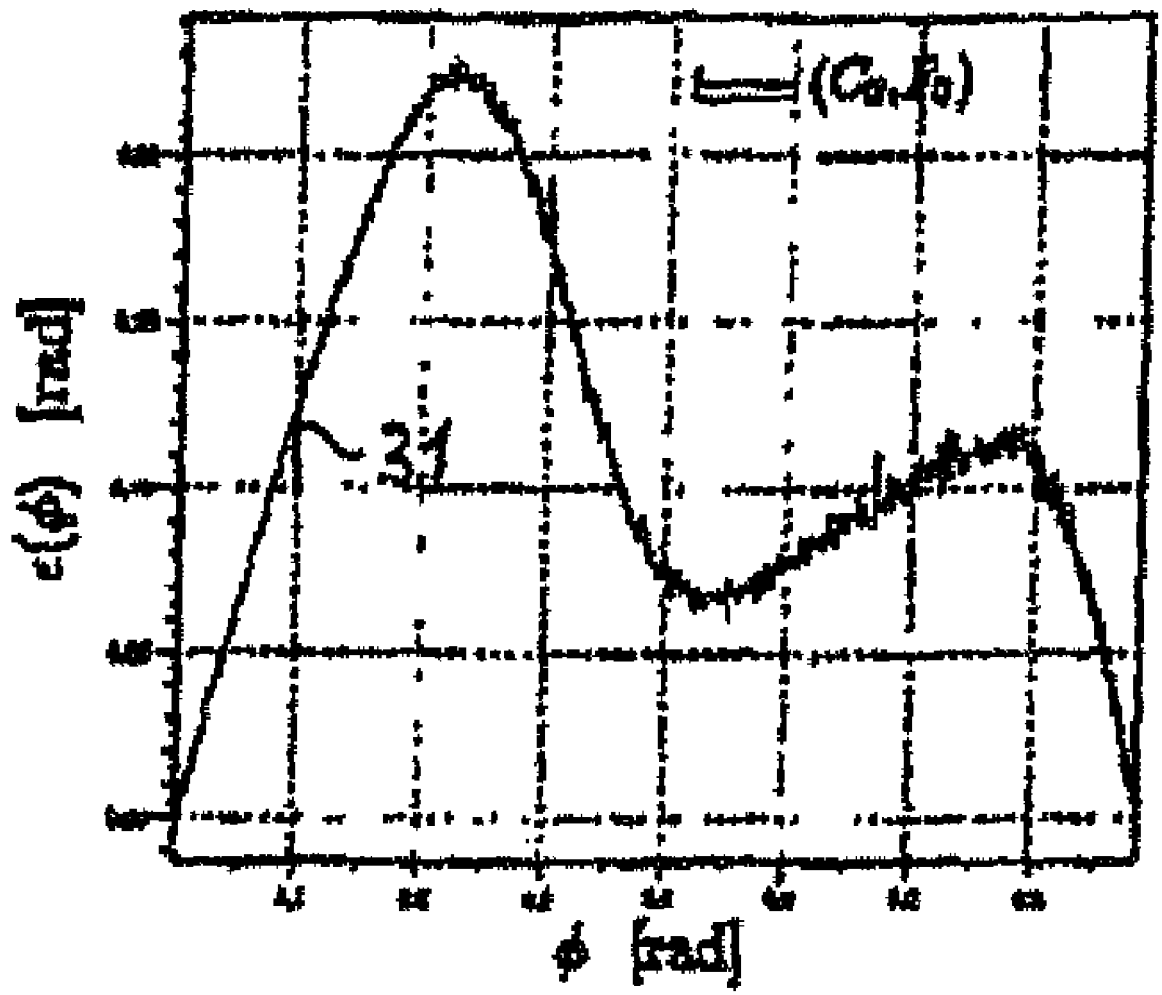
FIG. 3 illustrates the characteristic of the detector in FIG. 2 for $E_S/N_O=19$ dB, according to the technique used in prior art.

The characteristic of the selected detector associated with an MAQ16 for a signal-to-noise ratio $E_S/N_O=19$ dB is shown in FIG. 3. The decision-making device used to generate the estimated symbols $\hat{d}(k)$ uses conventional decision-making boundaries $F_0$ of the constellation $C_0$ relative to the MAQ16. This characteristic reveals the following intrinsic properties of the phase detector:

its period:

$$\varepsilon(\phi) = \varepsilon\left(\phi + k\frac{\pi}{2}\right),$$

k∈Z. This property is the result of invariance of the MAQ constellation at a phase rotation of $$k\frac{\pi}{2}.$$

Among other things, this makes it possible to study only a single quadrant of the modulation used;

- its false latch points: none. There is a false latch point when the output from the detector cancels out and the sign of its slope is the same as the sign of the slope at the origin, while the phase error is not zero;
- its linear range 31: 0.2 radians (11.5 degrees). Within the linear range at the origin of the characteristic, the detector outputs information $\epsilon(\phi)$ representative of the phase error. Thus, as the length of the linear phase increases, the detector becomes increasingly capable of detecting a large phase error. Therefore, this provides a means of reducing the probability of the synchronisation system becoming unlatched in the presence of phase noise. Furthermore, the size of the linear range determines the feedback latching capacity in the presence of a frequency offset;
- its gain $K_d=1.2$. The gain of the detector is defined as being the slope of the linear range at the origin. As the value of $K_d$ increases, the value of $\epsilon(\phi)$ increasingly represents univocal information representative of the phase error.

The phase detector is sensitive to the noise level of the input signal. When the noise increases, its linearity range and its gain decrease. On the other hand, in some cases noise minimises the probability of false latching points.

Loop Characterisation

Assuming that the gain $K_d$ of the detector and the gain $K_0$ of the integrator are normalised, the estimated phase update relation is written as follows:

$$\hat{\theta}(k+1) = \hat{\theta}(k) + \alpha\varepsilon(k) + \beta\sum_{j\leq k}\varepsilon(j)$$

where α and β are the positive coefficients of the feedback filter.

In general, carrier recuperation systems use a second order feedback structure [3]. This is why this structure is used in examples described below, although once again this use is not restrictive.

In this case, the closed loop transfer function can be expressed in the following form:

$$Q(z) = \frac{z^{-1}(\alpha(1-z^{-1})+\beta)}{(1-z^{-1})^2 + z^{-1}(\alpha(1-z^{-1})+\beta)}$$

The structure of the second order feedback loop can be defined by two parameters more significant than α and β. The damping factor $\xi$ is a stability parameter determining oscillations of the estimated phase curve $\hat{\theta}(k)$. It is usually assumed that $\xi=0.707$[4], to guarantee that the loop is stable. Furthermore, the parameter used is the equivalent monolateral noise band of the loop $B_j$ that is normalised with respect to the duration of the symbols $T_S$. The latching velocity increases as the value of $B_jT_S$ increases, but the loop also generates a noisier estimate $\hat{\theta}(k)$.

The expression for $B_1T_S$ is defined as follows:

$$B_1T_s = \frac{1}{2}\int_{-\infty}^{+\infty} |Q(f)|^2 \, df$$

The coefficients α and β are deduced from loop parameters as follows:

$$\alpha = \frac{2B_jT_s}{\xi + \frac{1}{4\xi}}\left(2\xi - \frac{B_jT_s}{\xi + \frac{1}{4\xi}}\right)$$

$$\beta = \left(\frac{2B_jT_s}{\xi + \frac{1}{4\xi}}\right)^2$$

Performances of the conventional solution using a decision-making device based on constellation $C_0$ and the decision-making boundaries $F_0$ in latching mode are given in table 1 for $E_S/N_O=19$ dB. Latching times were measured in the case of a frequency offset $\Delta f_O=134$ kHz and for different values of the equivalent normalised noise band $B_1T_S$. As we have already mentioned, the latching time reduces as $B_1T_S$ increases.

TABLE 1

Performances of the conventional synchronisation system in the presence of a frequency offset $\Delta f_O = 134$ kHz and for $E_s/N_o = 19$ dB.

| Decision-making device | $B_1T_s = 5 \times 10^{-3}$ | $B_1T_s = 1 \times 10^{-2}$ | $B_1T_s = 5 \times 10^{-2}$ |
|---|---|---|---|
| $C_0$ and $F_0$ | 745000 $T_s$ | 53000 $T_s$ | 360 $T_s$ |

Presentation of the Invention

Examples about modifications use the parameters in table 2, so as to present homogeneous numeric results. Obviously, this is a non-limitative example.

TABLE 2 parameters used in application examples.

| Parameter | Value |
| --- | --- |
| Detector | $\epsilon_4$ (k) |
| Modulation | MAQ16 |
| Symbol throughput | $1/T_s$ = 6.8 MS/s |
| Signal-to-noise ratio | $E_s/N_0$ = 19 dB |

2.1 First Embodiment: Modification of Decision-Making Boundaries

Tolerance to a phase error can be improved by modifying decision-making boundaries, at least for some symbols in the constellation $C_0$. Advantageously, any modification to decision-making boundaries is the result of a compromise between tolerance to Gaussian noise and to a phase error.

2.1.1 Principle

Figure 4:
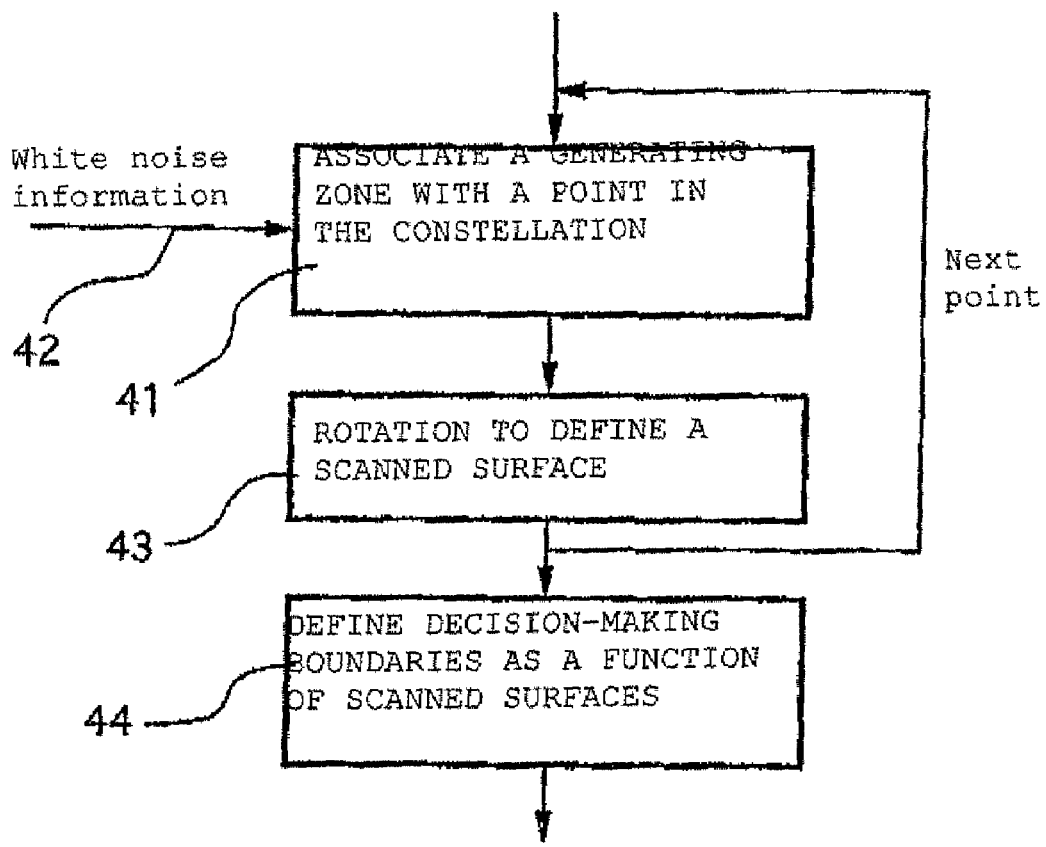
FIG. 4 is a general mimic diagram of an implementation of the invention.

2.1.1.1 General Principle (FIG. 4)

FIG. 4 shows a simplified block diagram illustrating the general principle of an embodiment of the invention.

At least one generating zone (55) representative of the potential effect of Gaussian additive noise on the point considered (see FIG. 5) is associated (41) with each point in the constellation (or at least with some points, and in this case preferably at least the external points of the constellation).

This generating zone 55 could be a circle, but other shapes could also be considered. In this case, the radius of the circle is advantageously a function of the standard deviation σ of the Gaussian additive noise 42. In other words, the system is adaptive as a function of the Gaussian noise level 42 (obviously, in a simplified version the boundaries could be fixed to correspond to an average situation).

Information on additive noise can be obtained by various known methods, and for example by analysis of the signal received during a period during which no signal is emitted or during which a reference signal (known to the receiver) is transmitted.

Several generating zones 56, 57 (FIG. 5) (for example two, corresponding to circles with radii σ and 2σ) are advantageously taken into account, at least for some of the points, to optimise the boundaries.

They may or may not be concentric.

The generating zones may be concentrated on the point in the constellation or they may be offset from it (third embodiment).

Once these generating zones have been obtained, a rotation 58 is applied (43) to them, so as to define a scanned surface 59 representative of the potential effect of a phase rotation. Since this rotation is applied to the generating zone, the scanned surface is representative firstly of the effect of Gaussian additive noise and secondly the effect of a phase rotation.

The rotation range applied to each of the generating zones depends on symmetries induced by the constellation. Thus, referring to the example in FIG. 5, points 51 and 52 are affected by a rotation of π/2. On the other hand, points 53 and 54, which are both on the same radius, are rotated by π/4.

The result is thus a series of plots of portions of circles 5101, 5102, 5103 corresponding to the edges of scanned surfaces.

Starting from these elements, adaptive boundaries 5101, 5102, 5103 are defined (44) that enable more efficient demodulation in the presence of phase noise and therefore particularly better latching of the synchronisation system.

Thus, for example, the received value 512 will be coffectly associated with point 52, while according to the conventional technique it would be incoffectly associated with point 53.

The boundaries are formed starting from arcs of circles 5101, 5102, 5103, portions of straight lines 5131, 5132 corresponding to mediating planes between points, or symbols in the constellation.

Obviously, these boundaries may be slightly modified. For example, it could be decided to linearise all or some of the arcs of circles, if this simplifies the implementation.

Figure 5A:
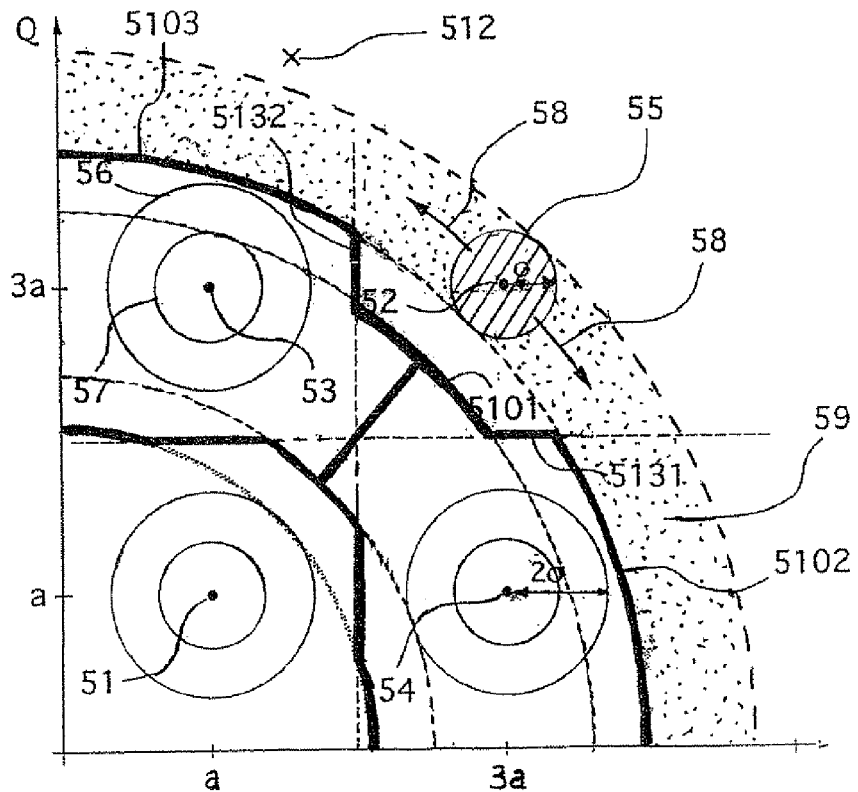
FIGS. 5 a and 5 b show the first quadrant of a constellation MAQ16 using modified decision-making boundaries according to a first embodiment of the invention.
Figure 5B:
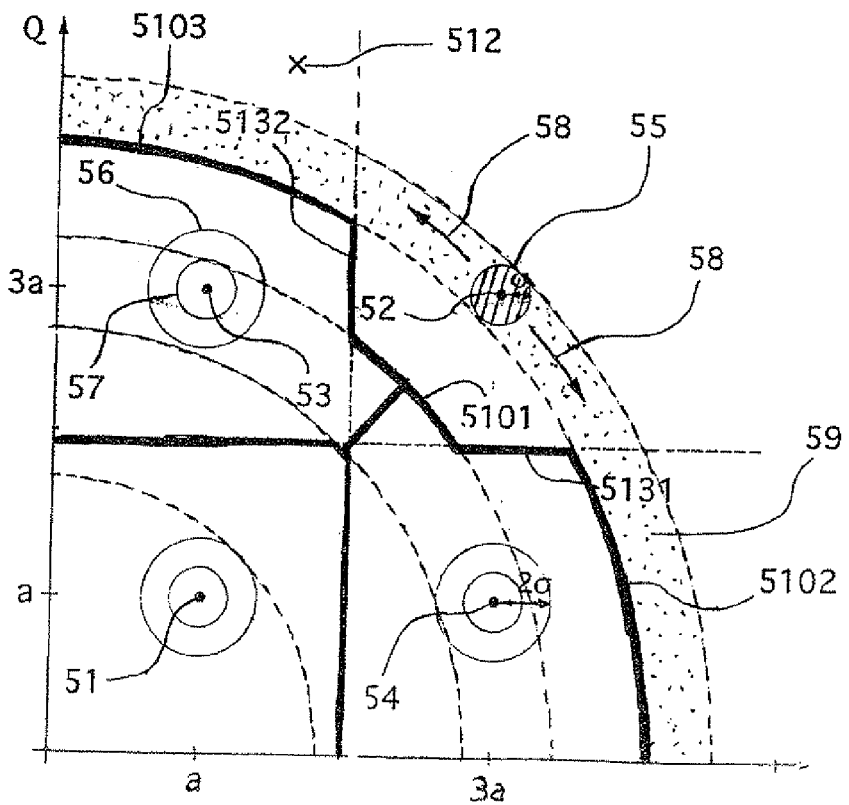

Detailed Example (FIG. 5)

FIG. 5 illustrates the embodiment of this type of compromise in the case of a signal-to-noise ratio $E_S/N_O$=19 dB. The symbols of the first quadrant of the constellation $C_0$ are represented by points (+a, +a), (+3a, +a), (+a, +3a) and (+3a, +3a) where a=$1/\sqrt{10}$ is the energy normalisation factor.

In order to take account of the phase error in the presence of Gaussian additive white noise (BBAG) to estimate received symbols, we define decision regions delimited by arcs of circles and mediating planes between symbols located at the same distance from the centre of the constellation. These new zones are the result of the displacement of symbols around a circle in the presence of a phase error.

For example, the radius of circles centered on constellation symbols are r=σ and r=2σ, where σ is the standard deviation of Gaussian additive noise (other values of the type α.σ could be used). The probability that a symbol affected by Gaussian noise is within the circle with radius σ is of the order of 90%. Thus, decision-making boundaries are adapted such that the tolerance to a phase error is maximum for all noisy symbols contained within the circle with radius a or within the circle with radius 2σ, if this is possible.

It is found that the modified boundaries particularly affect decisions made about symbols external to the constellation that are the most sensitive to phase errors.

However, note that there is a limit to the application of this principle: the maximum value of the standard deviation of Gaussian noise must be less than a/2 (where 2a is the minimum distance between symbols). This application limit is represented by a minimum signal-to-noise ratio of 16 dB in the case of an MAQ16.

2.1.3 Example Embodiment

Figure 6:
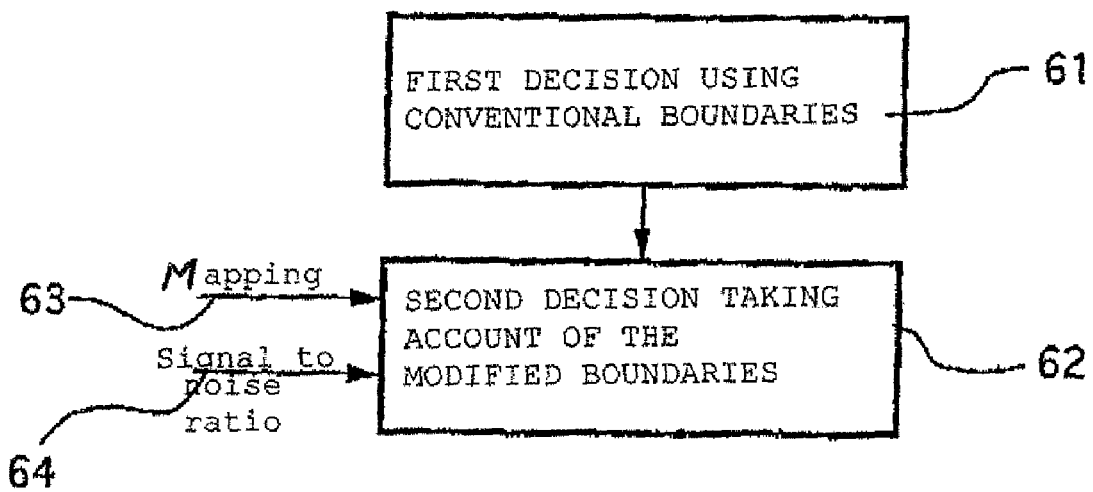
FIG. 6 illustrates an example use of demodulation using the boundaries in FIG. 5.

The implementation of a demodulation based on this principle can be broken down into two distinct parts, as shown in FIG. 6.

Figure 1:
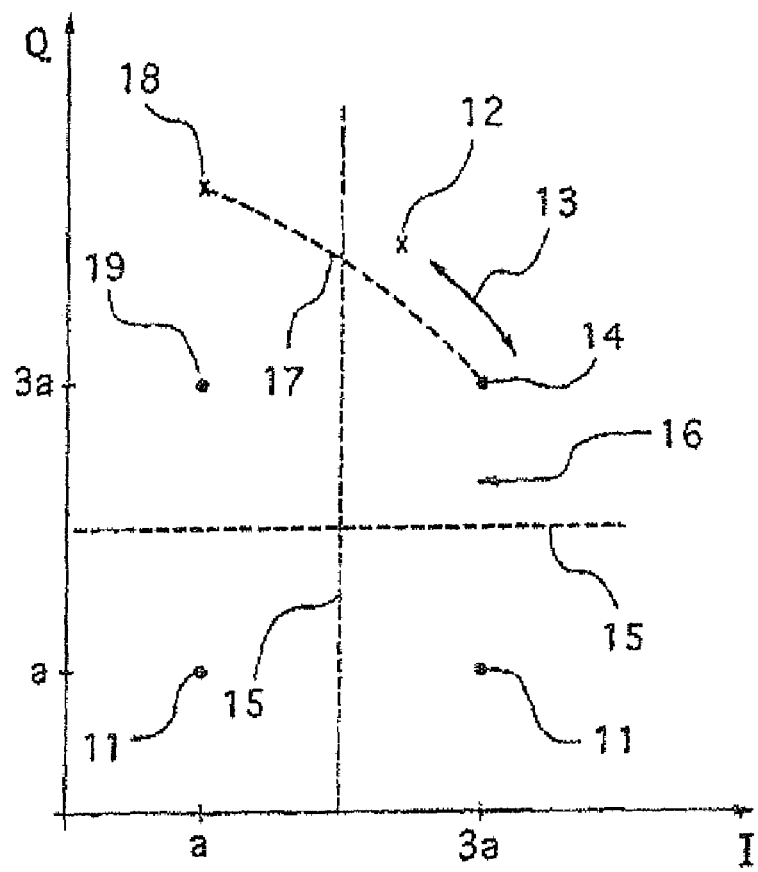
FIG. 1, already described in the preamble, illustrates a modulation constellation MAQ16, and the principle of its demodulation according to prior art.

The first step consists of a conventional demodulation 61 (according to FIG. 1) which associates the symbol d̂(k) of the closest constellation $C_0$ with a received symbol w(k); this is equivalent to making a decision with respect to conventional boundaries $F_0$.

The second step consists of applying an algorithm 62 that will be denoted $M_A$, making a second decision starting from the result of the conventional demodulation d̂(k) and the received symbol w(k). This algorithm uses mapping 63 of the constellation and the signal-to-noise ratio 64 as parameters. With these two parameters, a second decision can then be made about the received symbol w(k) by using the modified decision-making boundaries relative to the first estimated symbol d̂(k) denoted $F_0M_A$ and shown as a continuous line in FIG. 5 (5103, 5132, 5101, 5131, 5102).

In practice, it is more judicious to perform this procedure in two steps since in the second step, it is necessary to consider boundaries modified according to algorithm $M_A$ and only related to the symbol d̂(k) estimated during the first step.

All that has to be taken into account is the amplitude of the received value, and if necessary the phase shift of this value (if there is any ambiguity between two possible symbols with the same amplitude).

The result of this operation outputs a final estimated symbol $\hat{d}_M(k)$. If the received symbol (wk) belongs to the modified decision region of the first estimated symbol $\hat{d}(k)$ then $\hat{d}_M(k)=\hat{d}(k)$ else $\hat{d}_M(k) \neq \hat{d}(k)$.

2.1.4 Detector Characteristic

Figure 7:
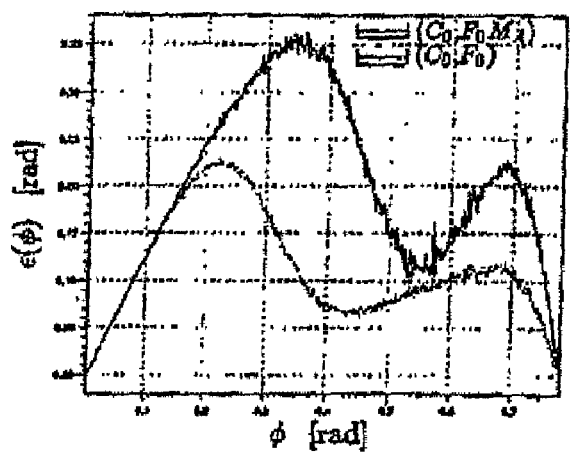
FIG. 7 illustrates a characteristic of a phase detector using the decision-making boundaries in FIG. 5, for $E_S/N_O=19$ dB.

The characteristic of the detector that uses the estimated symbols $\hat{d}$ (k) output from the modified decision-making device ($C_0$ $F_0$ $M_A$) is shown in FIG. 7 for $E_S/N_0=19$ dB.

It can be seen that the linear range for the proposed solution (3 radians, or 17.2 degrees) is slightly greater than the linear range for a conventional solution (2 radians, or 11.5 degrees).

2.1.5 Performances

Table 3 shows latching mode performances of the synchronization system based on the modified decision-making device that uses the constellation $C_0$ associated with decision-making boundaries $F_0M_A$. These performances were obtained for a frequency offset $\Delta f_0=134$ kHz, a signal to noise ratio $E_S/N_0=19$ dB and for different values of $B_1T_S$.

It is found that the modification to boundaries used by the decision-making device reduces the latching time by a factor equal to 2.5 for $B_1T_S=5\times10^{-2}$ and 4.5 for $B_1T_S=5\times10^{-3}$.

TABLE 3

Performances of the modified synchronization system ($C_0$ and $F_0M_A$) in the presence of a frequency offset $\Delta f_0 = 134$ kHz and for $E_s/N_0 = 19$ dB.

| Decision-making device | $B_1T_s = 5 \times 10^{-3}$ | $B_1T_s = 1 \times 10^{-2}$ | $B_1T_s = 5 \times 10^{-2}$ |
| --- | --- | --- | --- |
| $C_0$ and $F_0$ | 745000 $T_s$ | 53000 $T_s$ | 360 $T_s$ |
| $C_0$ and $F_0M_A$ | 162000 $T_s$ | 11300 $T_s$ | 136 $T_s$ |

2.2 Second Embodiment: Modification of the Constellation on Emission 2.2.1 Principle The inventors noticed that if the external symbol is translated from position (+3a, +3a) to position (+(3+x)a, +(3+x)a), the tolerance to a phase error associated with this symbol can be increased. Similarly, by translating the cross symbols from positions (+3a, +a) and (+a, +3a) to the corresponding positions (+(3−y)a, +a) and (+a, +(3−y)a), the tolerance to a phase error associated with these symbols is improved. The inventors confirmed that the values of x and y must satisfy the following condition for it to be possible to work at a constant normalization factor $a=A/\sqrt{10}$:

$$6x+x^2=6y-y^2$$

The Appendix contains the corresponding demonstration.

Figure 8:
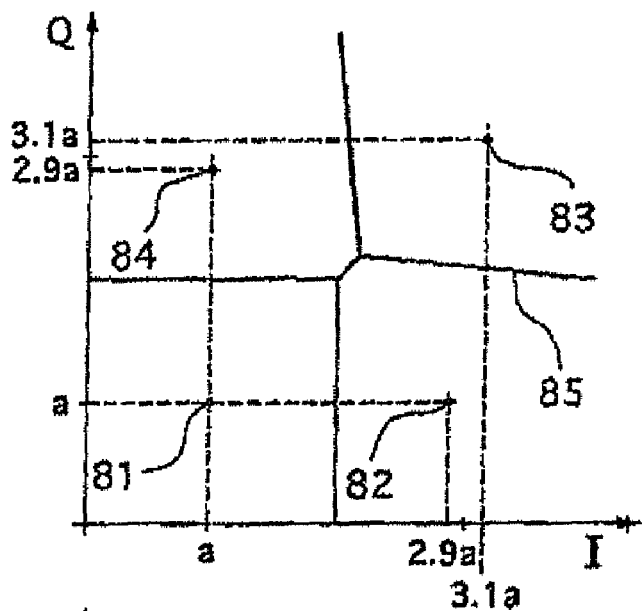
FIG. 8 shows a first quadrant of a constellation MAQ16 modified at the emission, according to the invention.

For small values of x and y, this relation may be approximated by $x \approx y$. In any case, we will choose small values so as not to excessively degrade performances in the presence of Gaussian additive noise. For readability reasons, we will identify the conventional constellation with the label $C_0$ and the modified constellation displayed in FIG. 8 with the label $C_1$. The constellation $C_1$ was determined by using x=y=0.1. Therefore, it is defined by symbols 81 to 84 in its first quadrant (+a, +a), (+2.9a, +a), (+a, +2.9a) and (+3.1a, +3.1a). It will be seen that the new positions of the symbols lead to a slight modification of the decision-making boundaries 85 that will be denoted $F_1$, in opposition to the conventional boundaries $F_0$ of a constellation $C_0$.

Figure 9:
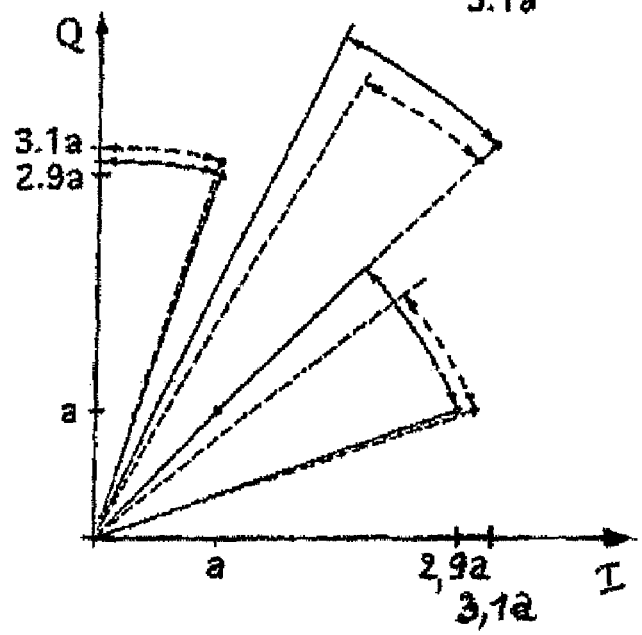
FIG. 9 compares tolerances to a phase error for the conventional MAQ16 constellation and the constellation in FIG. 8.

FIG. 9 represents the tolerances to phase errors of the different symbols in a conventional constellation $C_0$ and the modified constellation $C_1$. It shows that tolerances are better in the case of the constellation $C_1$.

2.2.2 Characteristic of the Phase Detector

Figure 10:
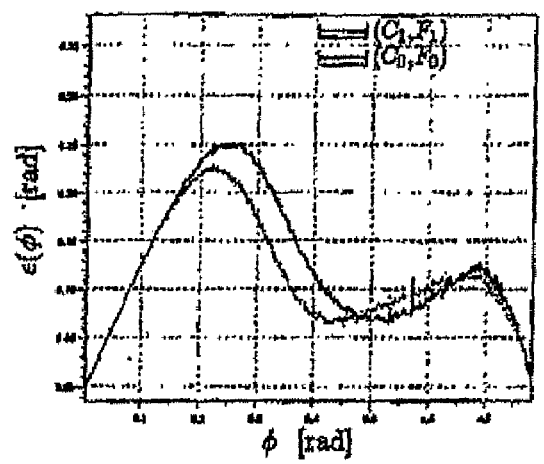
FIG. 10 illustrates the characteristic of a phase detector for $E_S/N_O=19$ dB, when the constellation in FIG. 8 is used.

The characteristic of the detector that uses estimated symbols $\hat{d}(k)$ output from the modified decision-making device ($C_1$, $F_1$) is shown in FIG. 10 for $E_S/N_0=19$ dB.

The proposed solution has a larger linear range (2.39 radians or 13.7 degrees) than a conventional solution (2 radians, or 11.5 degrees).

2.2.3 Performances

Table 4 shows the performances in latching mode of the synchronization system based on the modified decision-making device that uses the modified constellation $C_1$ and its relative decision-making boundaries $F_1$. These performances were obtained by a frequency offset $\Delta f_0=134$ kHz, a signal-to-noise ratio $E_S/N_0=19$ dB and for different values of $B_1T_S$.

TABLE 4

Performances of the notified synchronization system ($C_1$ and $F_1$) in the presence of the frequency offset $\Delta f_0 = 134$ kHz and for $E_s/N_0 = 19$ dB

| Decision-making device | $B_1T_s = 5 \times 10^{-3}$ | $B_1T_s = 1 \times 10^{-2}$ | $B_1T_s = 5 \times 10^{-2}$ |
| --- | --- | --- | --- |
| $C_0$ and $F_0$ | 745000 $T_s$ | 53000 $T_s$ | 360 $T_s$ |
| $C_1$ and $F_1$ | 405000 $T_s$ | 42000 $T_s$ | 300 $T_s$ |

It is found that the modification to the constellation used by the decision-making device provides a means of reducing latching times by a factor of between 1.2 for $B_1T_S=5\times10^{-2}$ and 1.8 for $B_1T_S=5\times10^{-3}$.

2.3 Third Embodiment: Combinations of Previous Solutions (Modification of the Constellation and Decision-Making Boundaries)

Performances can be improved by combining the previous two optimisations described above: modification of decision-making boundaries and modification of the constellation.

2.3.1 First Variant 2.3.1.1 Principle

Figure 11:
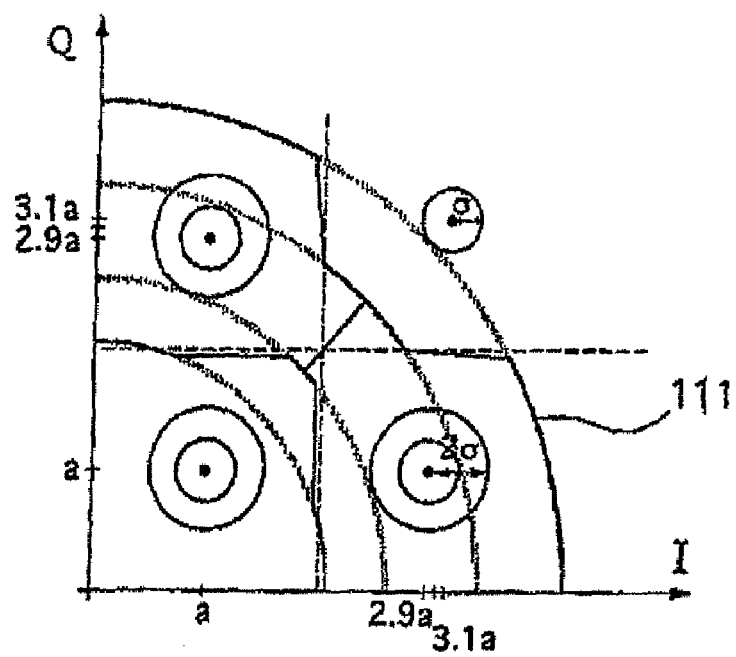
FIG. 11 presents the first reception quadrant of a constellation MAQ16 modified as shown in FIG. 8 and with modified boundaries according to the invention.

A first possible variant of the modified demodulation is a combination of a modified constellation $C_1$ of decision-making boundaries $F_1$ and a modified boundaries algorithm $M_A$. The first quadrant of such a constellation is shown in FIG. 11 in the case of an $E_S/N_0$ ratio equal to 19 dB. The resulting decision-making boundaries 111 will be denoted $F_1M_A$.

2.3.1.2 Detector Characteristic

Figure 12:
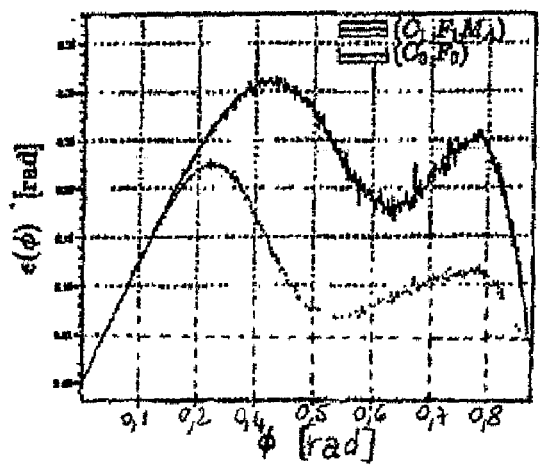
FIG. 12 illustrates the characteristics of a phase detector for $E_S/N_O=19$ dB, in the case of a decision based on FIG. 11.

FIG. 12 shows the characteristic of the detector that uses estimated symbols d(k) output from the modified decision-making device ($C_1$, $F_1M_A$) for $E_S/N_0=19$ dB.

It can be seen that the linear range for the proposed solution (2.89 radians or 16.6 degrees) is more than the linear range for a conventional solution (2 radians, or 11.5 degrees).

2.3.1.3 Performances

Table 5 shows performances in latching mode of the synchronization system based on the modified decision-making device that uses the modified constellation $C_1$ and the modified decision-making boundaries $F_1M_A$. These performances were obtained for a frequency offset $\Delta f_0=134$ kHz, a signal-to-noise ratio $E_S/N_0=19$ dB, and for different values of $B_1T_S$.

It can be seen that a modification of the constellation used by the decision-making device provides a means of reducing latching times by a factor of between 3 for $B_1T_S=5\times10^{-3}$ and 3.5 for $B_1T_S=5\times10^{-2}$.

TABLE 5

Performances of the modified synchronization system ($C_1$ and $F_1M_A$) in the presence of a frequency offset $\Delta f_0 = 134$ kHz and for $E_S/N_0 = 19$ dB

| Decision-making device | $B_1T_s = 5 \times 10^{-3}$ | $B_1T_s = 1 \times 10^{-2}$ | $B_1T_s = 5 \times 10^{-2}$ |
|---|---|---|---|
| $C_0$ and $F_0$ | 745000 $T_s$ | 53000 $T_s$ | 360 $T_s$ |
| $C_1$ and $F_1M_A$ | 241000 $T_s$ | 24500 $T_s$ | 98 $T_s$ |

2.3.2 Second Variant

2.3.2.1 Principle

Figure 13:
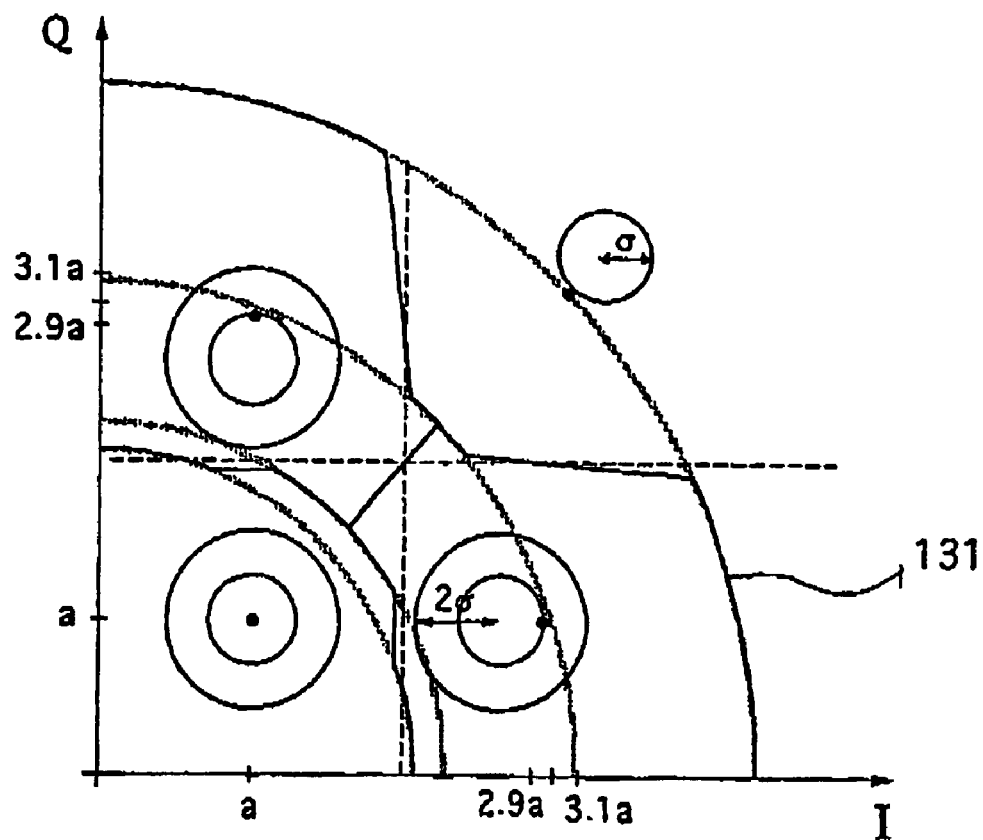
FIG. 13 shows the first reception quadrant of a constellation MAQ16, using boundaries modified according to the invention and a simulation of a modification in this constellation at the emission.

The second variant uses a constellation $C_1$ combined with an algorithm that we will denote $M_B$. This algorithm is different from the algorithm $M_A$ in that it uses a virtual constellation and not the constellation used, as a parameter. The effect of this virtual constellation is to centre the circles with the radii $\sigma$ and $2\sigma$ on virtual symbols, which induces a modification to the decision-making boundaries obtained when the algorithm $M_A$ is used. The virtual constellation provided as a parameter is composed of the following symbols (+a, +a), (+2.8a, +a), (+a, +2.8a) and (+3.2a, +3.2a). The decision-making boundaries 131 used are shown in FIG. 13.

2.3.2.2—Detector Characteristic

Figure 14:
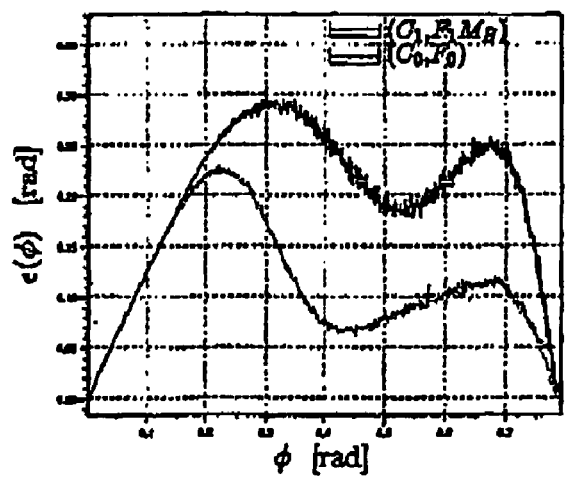
FIG. 14 illustrates the characteristic of a phase detector for $E_S/N_O=19$ dB in the case of a decision based on FIG. 13.

The characteristic of the detector that uses the estimated symbols ˆ(k) output from the modified decision-making device ($C_1$, $F_1M_B$) is shown in FIG. 14 for $E_S/N_0$ 19 dB.

It is observed that the linear range for the proposed solution (2.89 radians or 16.6 degrees) is more than the linear range for a conventional solution (2 radians, or 11.5 degrees).

2.3.2.3—Performances

Table 6 shows the performances in latching mode of the synchronization system based on the modified decision-making device that uses the modified constellation $C_1$ and the modified decision-making boundaries $F_1MB$. These performances were obtained for a frequency offset $\Delta f_0 = 134$ kHz, a signal-to-noise ratio $E_S/N_0 = 19$ dB and for different values of $B_1T_S$.

TABLE 6

Performances of the modified synchronization system ($C_1$ and $F_1M_B$) in the presence of a frequency offset $\Delta f_0 = 134$ kHz and for $E_S/N_0 = 19$ dB

| Decision-making device | $B_1T_s = 5 \times 10^{-3}$ | $B_1T_s = 1 \times 10^{-2}$ | $B_1T_s = 5 \times 10^{-2}$ |
|---|---|---|---|
| $C_0$ and $F_0$ | 745000 $T_s$ | 53000 $T_s$ | 360 $T_s$ |
| $C_1$ and $F_1M_B$ | 249000 $T_s$ | 17900 $T_s$ | 98 $T_s$ |

It is found that the modification to the constellation used by the decision-making device provides a means of reducing latching times by a factor of between 3 for $B_1T_S = 5 \times 10^{-3}$ and 5 for $B_1T_S = 5 \times 10^{-2}$.

2.4—Summary of the Modifications Made

2.4.1—Detector Characteristics

The dimensions of the linear ranges of the phase detector related to the associated decision-making devices are given in Table 7.

TABLE 7

Size of linear ranges of the phase detector

| Decision-making device | Size of linear range |
|---|---|
| $C_0$ and $F_0$ | 11.5 degrees |
| $C_1$ and $F_1$ | 13.7 degrees |
| $C_0$ and $F_0M_A$ | 17.2 degrees |
| $C_1$ and $F_1M_A$ | 16.6 degrees |
| $C_1$ and $F_1M_B$ | 16.5 degrees |

2.4.2—Performances

Table 8 shows PLL performances in acquisition mode for the different decision-making devices studied, in the case of a frequency offset $\Delta f_0 = 134$ kHz as a function of the equivalent PLL noise band $B_1$ normalized as a function of the symbol throughput $1/T_S = 6.8$MS/s.

TABLE 8

Performances in acquisition mode for $E_S/N_0 = 19$ dB for different demodulation types used by the DDMLFBT and for different values of $B_1T_S$

| Modulation type | $B_1T_S = 5 \times 10^{-3}$ | $B_1T_S = 1 \times 10^{-2}$ | $B_1T_S = 5 \times 10^{-2}$ |
|---|---|---|---|
| $C_0$ and $F_0$ | 745000 $T_s$ | 53000 $T_s$ | 360 $T_s$ |
| $C_1$ and $F_1$ | 405000 $T_s$ | 42000 $T_s$ | 300 $T_s$ |
| $C_0$ and $F_0M_A$ | 162000 $T_s$ | 11300 $T_s$ | 136 $T_s$ |
| $C_1$ and $F_1M_A$ | 241000 $T_s$ | 24500 $T_s$ | 98 $T_s$ |
| $C_1$ and $F_1M_B$ | 249000 $T_s$ | 17900 $T_s$ | 98 $T_s$ |

The simulation results show a significant reduction in the latching time in the case in which modified decision-making devices are used, regardless of the equivalent noise band used.

As long as $B_1T_S$ remains less than $10^{-2}$, the ($C_0$, $F_0M_A$) solution appears to be the most attractive. On the other hand, the ($C_1$, $F_1M_A$) and ($C_1$, $F_1M_B$) solutions can give better latching times for higher values of $B_1T_S$.

Moreover, a study was carried out on performances of the different configurations in tracking mode. It was observed that performances were identical when the ($C_0$, $F_0$), ($C_1$, $F_1$), ($C_1$, $F_1M_A$) and ($C_1$ $F_1M_B$) decision-making devices were used. On the other hand, the performances of the synchronization system associated with the ($C_0$, $F_0M_A$) decision-making device are slightly less optimised than the previous four solutions in tracking mode.

3. Optimisation of Demodulation Functions

The decision-making devices described above were also used in the demodulation system. In this part, we will present the performances on the Gaussian channel of the demodulator MAQ16 associated with different decision-making devices, and if a local oscillator affected by a phase noise is used. The noisy signal input to this demodulator after the carrier has been retrieved is affected by a residual phase error with a centered Gaussian probability density and variance $\sigma_\epsilon^2$. Table 9 presents the performances obtained in terms of bit error rates for $E_S/N_0 = 19$ dB and for different values of the variance of the phase error that existed before demodulation.

TABLE 9

Performances for $E_s/N_0 = 19$ dB in the presence of a residual Gaussian phase error with variance $\sigma_\epsilon^2$

| $\sigma_2^\epsilon$ | $C_0$ and $F_0$ | $C_1$ and $F_1$ | $C_0$ and $F_0M_A$ | $C_1$ and $F_1M_B$ |
|---|---|---|---|---|
| $4 \times 10^{-1}$ | $2.78 \times 10^{-1}$ | $2.75 \times 10^{-1}$ | $2.40 \times 10^{-1}$* | $2.50 \times 10^{-1}$ |
| $1 \times 10^{-1}$ | $1.31 \times 10^{-1}$ | $1.24 \times 10^{-1}$ | $1.04 \times 10^{-1}$* | $1.06 \times 10^{-1}$ |
| $4 \times 10^{-2}$ | $5.12 \times 10^{-2}$ | $4.55 \times 10^{-2}$ | $3.78 \times 10^{-2}$* | $3.82 \times 10^{-2}$ |
| $1 \times 10^{-2}$ | $4.6 \times 10^{-3}$ | $3.5 \times 10^{-3}$ | $3.11 \times 10^{-3}$* | $3.12 \times 10^{-3}$ |
| $8 \times 10^{-3}$ | $2.8 \times 10^{-3}$ | $2.1 \times 10^{-3}$ | $1.9 \times 10^{-3}$ | $1.8 \times 10^{-3}$* |
| $5 \times 10^{-3}$ | $1.0 \times 10^{-3}$ | $7.6 \times 10^{-4}$ | $7.8 \times 10^{-4}$ | $7.3 \times 10^{-4}$* |
| $1 \times 10^{-3}$ | $1.0 \times 10^{-4}$ | $8.9 \times 10^{-5}$* | $1.7 \times 10^{-4}$ | $1.0 \times 10^{-4}$ |
| $5 \times 10^{-4}$ | $6.5 \times 10^{-5}$* | $6.6 \times 10^{-5}$ | $1.5 \times 10^{-4}$ | $8.3 \times 10^{-5}$ |
| $1 \times 10^{-12}$ | $4.2 \times 10^{-5}$* | $4.8 \times 10^{-5}$ | $1.2 \times 10^{-4}$ | $6.9 \times 10^{-5}$ |

On each line of this table, the * symbol adjacent to a value of the variance of the phase error indicates the decision-making device that has the best performances.

This results table shows three possible configurations:

for large variances, the modified decision-making devices have the best performances;

for moderate to weak variances, use of the constellation $C_1$ is a good compromise;

as would be expected, the lowest BER for very low variance values is obtained by the conventional decision-making system.

Demodulation performances were also studied in the case of a large signal-to-noise ratio $E_s/N_0=30$ dB. These results presented in Table 10 demonstrate that the improvement in performances made by the use of modified decision-making devices is particularly significant when the signal-to-noise ratio is high.

TABLE 10

Performances for $E_s/N_0 = 30$ dB in the presence of a residual Gaussian phase error with variance $\sigma_\epsilon^2$

| $\sigma_2^\epsilon$ | $C_0$ and $F_0$ | $C_1$ and $F_1$ | $C_0$ and $F_0M_A$ | $C_1$ and $F_1M_B$ |
|---|---|---|---|---|
| $4 \times 10^{-1}$ | $2.75 \times 10^{-1}$ | $2.72 \times 10^{-1}$ | $2.37 \times 10^{-1}$* | $2.51 \times 10^{-1}$ |
| $1 \times 10^{-1}$ | $1.22 \times 10^{-1}$ | $1.15 \times 10^{-1}$ | $9.60 \times 10^{-2}$* | $1.01 \times 10^{-1}$ |
| $4 \times 10^{-2}$ | $4.12 \times 10^{-2}$ | $3.49 \times 10^{-2}$ | $2.82 \times 10^{-2}$* | $3.17 \times 10^{-2}$ |
| $1 \times 10^{-2}$ | $6.8 \times 10^{-4}$ | $4.02 \times 10^{-4}$ | $3.10 \times 10^{-4}$* | $3.70 \times 10^{-4}$ |
| $8 \times 10^{-3}$ | $2.06 \times 10^{-4}$ | $1.03 \times 10^{-4}$ | $7.8 \times 10^{-5}$* | $9.6 \times 10^{-5}$ |
| $5 \times 10^{-3}$ | $7.6 \times 10^{-6}$ | $2.9 \times 10^{-6}$ | $2.1 \times 10^{-6}$* | $2.6 \times 10^{-6}$ |

4—Summary

The principles used for optimisation of the carrier recuperation and demodulation system have been presented for the case of an MAQ16 and a DDMLFB-T system.

However, these principles can be applied to any amplitude modulation in quadrature with an order of more than four, and to any Directed Decision carrier recuperation system.

Note also that in the case of systems affected by strong Gaussian noise, it is always possible to modify decision-making boundaries related to external symbols of the constellation. These symbols are more sensitive to phase errors, consequently this simple change to the boundaries provides a means of significantly improving demodulation and synchronization functions of the system in the presence of phase errors.

APPENDIX

Normalisation of Energy for an MAQ16

Conventional MAQ16

Symbols in the first quadrant are (+a,+a), (+3a, +a), (+a, +3a). To normalize energy of symbols in constellation at 1, the value of a that solves the following equation has to be determined:

$$(a^2+a^2)=((3a)^2+(3a)^2)+2((3a)^2+a^2)=4$$

hence $$2a^2+18a^2+20a^2=4$$

and finally $$a = \frac{1}{\sqrt{10}}$$

Modified MAQ16

Consider the case of a modified MAQ16 such that the symbols in the first quadrant are (a, a), (a, a(3−y)), (a(3−y), a) and (a(3+x), a(3+x)). We will determine the required value of y when x is known, such that the value of a is identical to the value used in the case of a conventional MAQ16. We then need to solve the following equation:

$$2a^2+18a^2+20a^2+2a^2[6x+x^2-6y+y^2]=4$$

To keep the value a for a conventional MAQ16, we need to choose x and y such that the term between square brackets is zero. This means finding a solution to the following equation:

$$6x+x^2=6y-y^2$$

Example: the value of y in the case of an external symbol fixed at (+3.1a, +3.1a), in other words for x=0.1, is y=0.103.

The invention claimed is:

1. Method for demodulation of a digital signal received through a transmission channel, the method comprising:

associating each received value of the received signal with a corresponding point in the modulation constellation, as a function of decision-making boundaries, plotted as a function of at least one phase and / or amplitude characteristic of the modulation, so as to associate a corresponding decision region of a reception space with each of the points in the constellation, said constellation being represented in an I/Q plane having I and Q axes, wherein each of four quadrants of said I/Q plane comprises a set of points, comprising at least one external point, which is the furthest from the center of said I/Q plane, and for each of said external points, constructing demodulation boundaries defining a decision region associated with said external point, comprising the following steps:

association with said external point of at least one generating zone enclosing said external point with at least one of the points in the modulation constellation, the zone representing the potential effect of Gaussian additive noise;

application of a rotation of π/2, limited by the I and Q axes, to the generating zone in the reception space, so as to define a surface scanned by the generating zone, representing the potential effect of a phase shift on said external point;

definition of at least one boundary including a first arc of a circle from said I axis and a second arc of a circle from said Q axis, chosen such that said first and second arcs of circle correspond to said scanned surface.

2. The method of claim 1, wherein the decision making boundaries are variable as a function of variations in the Gaussian additive noise.

3. The method of to claim 1, wherein the disk is centered on the corresponding external point generating zone forms a disk.

4. The method of claim 3, characterized in that the radius of the disk is proportional to the standard deviation of the Gaussian additive noise.

5. The method of claim 3, wherein the disk is centered on the corresponding external point in the modulation constellation.

6. The method of claim 1, wherein at least one of the decision making boundaries is a combination of at least one portion of a boundary corresponding approximately to an edge of the scanned surface and at least one linear portion corresponding to an axis of symmetry defined by the modulation constellation.

7. The method of claim 1, wherein at least one of the generating zones is not centered on the corresponding external point in the modulation constellation, so as to simulate a modification to the constellation at the emission.

8. The method of claim 1, wherein the points associated with at least one decision making boundary adapted as a function of the potential effect of a phase shift preferably comprise at least the points in the constellation furthest from the center of the reception space.

9. The method of claim 1, wherein the modulation constellation corresponds to an amplitude modulation in quadrature.

10. The method of claim 9, wherein the receiver is a single-sensor receiver, and the reception space is the Fresnel plane.

11. The method of claim 1, wherein the received signal is a multi-carrier signal.

12. The method of claim 1, wherein the received signal is a single-carrier signal.

13. The method of claim 1, wherein the received signal is transmitted in burst.

14. The method of claim 1, wherein it is used during a latching phase in a phase locking loop.

15. The method of claim 1, wherein it is used under continuous reception conditions, after a phase locking loop has been latched, at least in the presence of loud phase noise.

16. The method of claim 1, wherein in the presence of a Gaussian additive noise greater than a predetermined threshold, the decision making boundaries ignore the potential effect of phase noise.

17. The method of claim 1, wherein it comprises the following steps:
compare the received value with a first set of boundaries, called conventional boundaries, formed so as to maximize distances between the points in the constellation and so as to make a first decision on the transmitted point corresponding to the received value;
measure the amplitude of the received value with respect to the center of the constellation; and
measure the signal-to-noise ratio.

18. Receiver of a digital signal received through a transmission channel, comprising demodulation means comprising means of associating a corresponding point in the modulation constellation with each received value of the received signal, as a function of decision-making boundaries plotted as a function of at least one phase and / or amplitude characteristic of the modulation, so as to associate each of the points in the constellation with a corresponding decision region of a reception space, said constellation being represented in an I/Q plane comprising I and Q axes, each of four quadrants of said I/Q plane comprising a set of points, comprising at least one external point, which is the furthest from the center of said I/Q plane, characterized in that the receiver comprises means for constructing, for each of said external points, demodulation boundaries defining a decision region associated with said external point comprising means for modifying at least one of the boundaries, taking account firstly of the potential effect of a phase shift on at least one of the external points in the modulation constellation, and secondly the potential effect of Gaussian additive noise applied to the external point, the Gaussian additive noise being represented by a generating surface associated with said external point, and the phase shift by a rotation of $\pi/2$, limited by the I and Q axes, so as to define a surface scanned by the generating zone, the boundary being chosen such that the scanned surface belongs approximately to the decision region associated with the corresponding point in the modulation constellation, and including a first arc of a circle from said I axis and a second arc of a circle from said Q axis, chosen such that said first and second arcs of circle correspond to said scanned surface.

19. System for transmission of at least one digital signal, from at least one emitter to at least one receiver,
wherein it uses means for modifying the modulation constellation on emission, said constellation being represented in an I/Q plane comprising I and Q axes, each of four quadrants of said I/Q plane comprising a set of points, comprising at least one external point, which is the furthest from the center of said I/Q plane, and means for modifying the corresponding decision-making boundaries on reception, taking account firstly of the potential effect of a phase shift on at least one of the external points in the modulation constellation, and secondly the potential effect of Gaussian additive noise applied to said external point,
the Gaussian additive noise being represented by a generating surface associated with said external the point, and the phase shift by rotation of $\pi/2$, limited by the I and Q axes, so as to define a surface scanned by the generating zone,
the boundary being chosen such that the scanned surface belongs mostly to the decision region associated the corresponding external point in the modulation constellation, and including a first arc of a circle from said I axis and a second arc of a circle from said Q axis, chosen such that said first and second arcs of circle correspond to said scanned surface.

20. The method of claim 17, further including:
modifying the first decision, as a function of the amplitude and the signal-to-noise ratio, so as to provide a second decision based on the decision making boundaries taking account of the potential effect of a phase shift; and
overcoming any ambiguity between at least two external points in the modulation constellation, as a function of a measurement of the angular position of the received value.

* * * * *

UNITED STATES PATENT AND TRADEMARK OFFICE
CERTIFICATE OF CORRECTION

PATENT NO. : 7,447,288 B2
APPLICATION NO. : 10/477810
DATED : November 4, 2008
INVENTOR(S) : Stephane Bougeard et al.

Page 1 of 1

It is certified that error appears in the above-identified patent and that said Letters Patent is hereby corrected as shown below:

Column 17
Line 28, delete "comprise at least the points" and insert --comprise at least the external points--

Lines 28-29, delete "furthest from the center of the reception space."

Column 18
Line 9, delete "characterized in that" and insert --wherein--

Line 22, delete "corresponding point" and insert --corresponding external point--

Line 42, delete "external the point" and insert --external point--

Signed and Sealed this

Seventeenth Day of November, 2009

David J. Kappos
*Director of the United States Patent and Trademark Office*